Patented Dec. 14, 1937

2,102,107

UNITED STATES PATENT OFFICE 2,102,107

PRODUCTION OF AMMONIUM SULPHATE

Gerrit Berkhoff, Jr., Kerensheide, Post Lutterade, Netherlands, assignor to De Directie van de Staatsmijnen in Limburg, Heerlen, Netherlands No Drawing. Application March 3, 1934, Serial No. 713,882. In the Netherlands October 16, 1933

10 Claims. (Cl. 23—119)

My invention relates to the production of ammonium sulphate and has for one of its objects to provide means whereby a particularly coarse-grained ammonium sulphate is obtained.

The invention is more particularly concerned with the production of an ammonium sulphate of this character by way of saturation or neutralization of commercial sulphuric acid such as is obtained in the vitriol chamber process.

Hitherto, in order to obtain ammonium sulphate in large crystals, it has been tried to influence the formation of this salt by mechanical means such as agitation, forcing of the gaseous ammonia into the saturation liquor (acid), mixing of the ammonia with inert gases, etc. Thus the specification of French Patent 663,105 recommends diluting the ammonia gas with steam, air, some other inert gas or a mixture of such gases or vapors.

However besides the physical conditions, under which the compound is being formed, also the chemical conditions must be taken into account, such as for instance the degree of acidity of the saturation liquor, which has been shown to be particularly important. As is well known, this acidity should be kept as low as possible. Apart therefrom it is a well known fact that in all processes based on crystallization the presence of foreign matter, such as the impurities brought in by the reacting compounds, often plays an important role, since all solids present in the liquor may considerably influence the growth of the crystals in certain directions. Whenever the commercial sulphuric acid contained considerable quantities of impurities, which accumulate in the saturation liquor, careful attention has been paid to the influence which these impurities exerted on the crystallization and one has tried to avoid or at least reduce the unfavorable action by adding chemical reagents.

In claim 2 of French Patent 663,105 mentioned above this principle is set out in a general manner as follows:—

"To the diluted or undiluted ammonia gas or to the diluents or to the saturation liquor itself chemical agents are added either in gaseous or in liquid form for the purpose of changing the appearance and hardness of the crystals of ammonium sulphate either by direct action on the sulphate or by acting on the impurities present in the liquor or in the diluent."

In lines 47 to 51, page 2, the French specification further states that by combining the two steps the form, volume, hardness and color of the ammonium sulphate can be regulated as desired.

The present invention contemplates changing the character of the crystals of ammonium sulphate in accordance with the teachings of the French specification by adding to the saturation liquor a phosphatic compound such as phosphoric acid or a phosphate. I have found that the slight change thus brought about in the composition of the saturation liquor suffices, if the general physical conditions of operation are favorable, to obtain a coarse-grained ammonium sulphate.

I prefer adding to the saturation liquor, while it still contains free acid, either a small quantity of phosphoric acid or a phosphate soluble in water or in dilute acid. I may however also add a raw phosphate, which has either been decomposed before being added or is introduced as such into the saturation liquor to be decomposed therein by the acid forming part of this liquor.

The quantity of phosphoric acid or phosphate added can be nicely adjusted, taking into account the introduction of impurities by the sulphuric acid or by other agents introduced into the saturation vessel. When the phosphate is added to the saturation liquor, a small quantity of a precipitate will form. I may now for instance add a quantity of phosphate such that on a further quantity of phosphate being added, no further precipitate is formed. In accordance with the character of the final product to be obtained I may however also add only so much phosphate, that only part of the impurities precipitatable by phosphate are removed.

The constitution of the precipitate varies in accordance with the character of the impurities present. Thus, if impure sulphuric acid is used, all ferric ions present therein will be precipitated by the phosphate under the form of ferric phosphate. The same applies to the aluminium which is also present in impure sulphuric acid. If chromium should be present, this metal will also be found in the phosphate precipitate. The analytical chemist knows that all these precipitates are formed only in a neutral or in a very slightly acid medium. It is therefore particularly surprising to see that such precipitates will also form at elevated temperature in a saturation liquor containing free sulphuric acid. I operate with a liquor containing not more than 1.5% free acid, calculated as sulphuric acid.

The crystals of ammonium sulphate are removed, if desired together with the phosphate precipitate, from the saturation vessel and subjected to further treatment as usual.

In order to illustrate the advance obtained by the addition of phosphoric acid or a phosphate to the saturation liquor, I will first describe the production of ammonium sulphate as hitherto practised, i. e. without the addition of phosphoric acid or a phosphate.

According to the old mode of proceeding a mixture of ammonia gas, obtained by synthesis, with air and steam is introduced in a saturation vessel containing 13 cubic metres of a saturation liquor saturated with ammonium sulphate, having a temperature of about 108° C., a ferric ion content of 2 grams per litre and a content of 6% free $H_2SO_4$, the degree of acidity of the liquor being kept constant by the equivalent addition of commercial sulphuric acid of 58 to 60° Bé. containing .5 gram ferric ion per litre. The addition of ammonia gas and sulphuric acid is regulated in such manner, that 75 tons ammonium sulphate are produced within 24 hours. The ammonium sulphate formed in the reaction is continuously removed from the vessel and after centrifuging and drying a product is obtained, in which the crystals present a proportion of length to width of about 10:1. On this product being sifted, 25% of the crystals will be found to be larger than .5 mm., while 71.5% are larger than .2 mm. In view of the presence of ferric ions and arsenic the degree of acidity of the saturation liquor cannot be reduced, since otherwise colloidal compounds of iron and arsenic will separate out, which tend to disturb the process.

In contradistinction thereto, if, in accordance with the present invention, 20 kgs. of a 14% superphosphate are added per hour to the saturation liquor constituted as described above, but the degree of acidity of which is reduced to .5 to 1% free $H_2SO_4$, the ferric ion content of the mother liquor will drop to about .04 gram per litre, and while all other physical and chemical conditions of operation including the composition of the acid introduced and the quantity of ammonium sulphate produced remain the same, I obtain a product, the crystals of which present an average proportion of length to width of 1.5:1. On this product being sifted it will be found that 77.5% of the crystals are larger than .5 mm. and 98% larger than .2 mm. The product does not dust, is excellently suited for strewing and shows almost no tendency to cake.

Instead of the 20 kgs. of a 14% superphosphate I may also add hourly for instance 7 kgs. of a 40% superphosphate, or 5.6 kgs. diammonium phosphate $(NH_4)_2HPO_4$ or 4.6 kgs. monoammonium phosphate $NH_4H_2PO_4$ or 4.2 kgs. phosphoric acid $H_3PO_4$ of 66% or 7 kgs. dicalcium phosphate $CaHPO_4.2H_2O$ of 41% or 11.2 kgs. of raw calcium phosphate $Ca_3PO_4$ of 25%.

These additions may be introduced either into the saturation liquor or into the sulphuric acid to be added to it. More especially when using raw phosphates I prefer adding them to the acid direct.

Various changes may be made in the details disclosed in the foregoing specification without departing from the invention or sacrificing the advantages thereof.

I claim:—

1. In the preparation, by the saturation process, of ammonium sulphate in relatively coarse crystalline form from solutions prepared with commercial sulphuric acid containing the usual small amounts of metallic impurities, the process which comprises adding to such a solution, while maintaining the concentration of sulphuric acid therein below 1.5 per cent, a soluble phosphatic compound in amount not substantially more than sufficient to precipitate said impurities from solution thereby producing a liquor having a reduced content of said metallic impurities in dissolved form, crystallizing ammonium sulphate from said liquor and recovering the coarse crystals thereby produced.

2. The process of claim 1 wherein the concentration of the sulphuric acid in said liquor is maintained between about 0.5 and 1.5 per cent.

3. The process of claim 1 wherein the soluble phosphatic compound is phosphoric acid.

4. The process of claim 1 wherein the soluble phosphatic compound is superphosphate.

5. The process of claim 1 wherein the soluble phosphatic compound is a raw phosphate.

6. The process of claim 1 wherein sulphuric acid is added to said liquor to maintain a concentration below 1.5 per cent and wherein said phosphatic compound is added to the sulphuric acid prior to its introduction into said liquor.

7. In the preparation of ammonium sulphate in relatively coarse crystalline form from commercial sulphuric acid solutions containing the usual small amounts of metallic impurities, the process which comprises adding to such a solution, while maintaining the concentration of sulphuric acid therein below 1.5 per cent, a soluble phosphatic compound in amount not substantially more than sufficient to precipitate said impurities from solution thereby producing a liquor having a reduced content of said metallic impurities in dissolved form, adding ammonia to said solution, crystallizing ammonium sulphate from said liquor and recovering the coarse crystals thereby produced.

8. In a continuous saturation process for producing ammonium sulphate from ammonia gas and commercial sulphuric acid containing dissolved metallic compounds which tend to accumulate in the saturation liquor, the steps which consist in maintaining the saturation liquor at an acidity of not more than 1.5% figured as $H_2SO_4$, supplying to the saturation liquor a soluble phosphatic compound in amount not substantially more than sufficient to react with said metallic compounds to convert them into insoluble phosphates, allowing crystallization of the ammonium sulphate to proceed until coarse grained crystals are produced, and then removing said coarse grained crystals with any accompanying insoluble metallic phosphates.

9. In a continuous saturation process for producing ammonium sulphate from cyanogen-free ammonia gas and commercial sulphuric acid containing dissolved metallic compounds which tend to accumulate in the saturation liquor, the steps which consist in maintaining the saturation liquor at an acidity of not more than 1.5% figured as $H_2SO_4$, supplying to the saturation liquor a soluble phosphatic compound in amount not substantially more than sufficient to convert said metallic compounds to insoluble phosphates, allowing crystallization of the ammonium sulphate to proceed until coarse grained crystals are produced, and then removing said coarse grained crystals with any accompanying insoluble metallic phosphates.

10. In a continuous saturation process of producing ammonium sulphate from ammonia and commercial sulphuric acid containing dissolved iron compounds which develop ferric ions tending to accumulate in the saturation liquor, the steps which comprise maintaining the saturation liquor at an acidity of not more than 1.5%, calculated as $H_2SO_4$, supplying to the saturation liquor a soluble phosphatic compound in amount not substantially more than sufficient to convert all ferric ions in excess of .04 gram per litre of the saturation liquor into phosphatic iron compounds which are insoluble in the saturation liquor, allowing crystallization of the ammonium sulphate to take place, and removing from the saturation liquor crystals of ammonium sulphate and any insoluble phosphatic iron compounds which accompany said crystals.

GERRIT BERKHOFF, Jr.